(12) United States Patent
Hamada (10) Patent No.: US 8,104,932 B2
(45) Date of Patent: Jan. 31, 2012

(54) BACKLIGHT STRUCTURE

(75) Inventor: Tetsuya Hamada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 318 days.

(21) Appl. No.: 12/524,236

(22) PCT Filed: Aug. 21, 2007

(86) PCT No.: PCT/JP2007/066140
§ 371 (c)(1),
(2), (4) Date: Jul. 23, 2009

(87) PCT Pub. No.: WO2008/090642
PCT Pub. Date: Jul. 31, 2008

(65) Prior Publication Data
US 2010/0027296 A1    Feb. 4, 2010

(30) Foreign Application Priority Data

Jan. 24, 2007    (JP) .................................. 2007-013241

(51) Int. Cl.
*F21V 29/00* (2006.01)

(52) U.S. Cl. ......... 362/373; 362/97.3; 362/632; 349/65; 349/161

(58) Field of Classification Search ........ 362/97.1–97.3, 362/294, 373, 632, 633; 349/61–65, 161
See application file for complete search history.

(56) References Cited

U.S. PATENT DOCUMENTS

| | | | | |
|---|---|---|---|---|
| 7,438,450 B2 * | 10/2008 | Aoki et al. | .................... | 362/373 |
| 7,452,121 B2 * | 11/2008 | Cho et al. | ..................... | 362/633 |
| 7,488,104 B2 | 2/2009 | Hamada et al. | | |
| 7,956,979 B2 * | 6/2011 | Oh et al. | ....................... | 349/161 |
| 2006/0132699 A1 * | 6/2006 | Cho et al. | ...................... | 349/161 |
| 2007/0211205 A1 * | 9/2007 | Shibata | ......................... | 349/161 |

FOREIGN PATENT DOCUMENTS

| | | |
|---|---|---|
| JP | 3-56974 U | 5/1991 |
| JP | 11-119216 A | 4/1999 |
| JP | 2000-19508 A | 1/2000 |
| JP | 2004-193002 A | 7/2004 |
| JP | 2005-265922 A | 9/2005 |
| JP | 2005-340065 A | 12/2005 |
| JP | 2006-156324 A | 6/2006 |

* cited by examiner

*Primary Examiner* — John A Ward (74) *Attorney, Agent, or Firm* — Birch, Stewart, Kolasch & Birch, LLP (57) ABSTRACT

A backlight structure includes: light source modules 1 and 1; a light guide plate 2 disposed between the light source modules 1 and 1; a rear plate 3 disposed at the rear side of the light source modules 1 and the light guide plate 2; a fan-mount plate 4 disposed at the rear side of the rear plate 3; and a cooling fan 5 mounted on the fan-mount plate 4. The rear plate 3 has portions thereof at the rear side of the light source modules 1 and 1 formed into protruding portions 3*a*, and has a portion thereof between the upper and lower protruding portions 3*a* formed into a flat surface 3*b*. A cooling wind passage 11 is formed between a front surface 4*a* of the fan-mount plate and the flat surface 3*b* of the rear plate. Heat from LED chips 1*a* of the light source modules is made to concentrate at the protruding portions 3*a* of the rear plate and is then rejected into the outside by the wind guided from the cooling fan 5 into the cooling wind passage 11.

24 Claims, 9 Drawing Sheets

BACKLIGHT STRUCTURE

TECHNICAL FIELD

The present invention relates to a backlight structure for use in, for example, a liquid crystal display apparatus, and more particularly to a backlight structure having a forced-cooling capability.

BACKGROUND ART

Conventionally, as a backlight structure for use in a liquid crystal display apparatus, there has been known a side-light-type backlight structure including: an LED module having a plurality of LED (light emitting diode) chips; and a light guide plate that receives, through a side surface thereof, and then emits, through a front surface thereof, the light from the LED module. This conventional backlight structure is fitted with heat dissipation fins on the outside of a rear plate accommodating the LED module and the light guide plate. The heat generated as the LED chips emit light is transferred to the heat dissipation fins via a fixing member fixing the LED module in position, a heat conductive sheet and a heat conductive member, and is then rejected into the air by the heat dissipation fins, thus achieving natural cooling (see, for example, Patent Document 1).

Conventionally, a backlight structure using an LED as a light source has been employed in compact electronic appliances such as a PDA (personal digital assistant) and a mobile phone terminal, because the LED emits a comparatively small amount of light, whereas in a backlight structure adopted in large-size electronic appliances such as a monitor apparatus, as a light source, a cold-cathode tube emitting a comparatively large amount of light has been used. Nowadays, however, with the development of high-luminance LEDs, LEDs have come into use in a backlight structure for large-size electronic appliances as well.

Inconveniently, high-luminance LEDs generate a large amount of heat; accordingly, when they are used as light sources in a conventional backlight structure, there arises the problem of insufficient cooling of the light sources.

Patent Document 1: JP-A-2006-156324

DISCLOSURE OF THE INVENTION

Problems to be Solved by the Invention

With respect to the conventional backlight structures mentioned above, commonly known solutions for improving cooling performance include enlargement of heat dissipation fins, provision of a cooling fan, and the like. Here, simply enlarging heat dissipation fins achieves only a limited increase in the cooling performance; thus, enlargement of heat dissipation fins needs to be accompanied by provision of a cooling fan.

Figure 8:
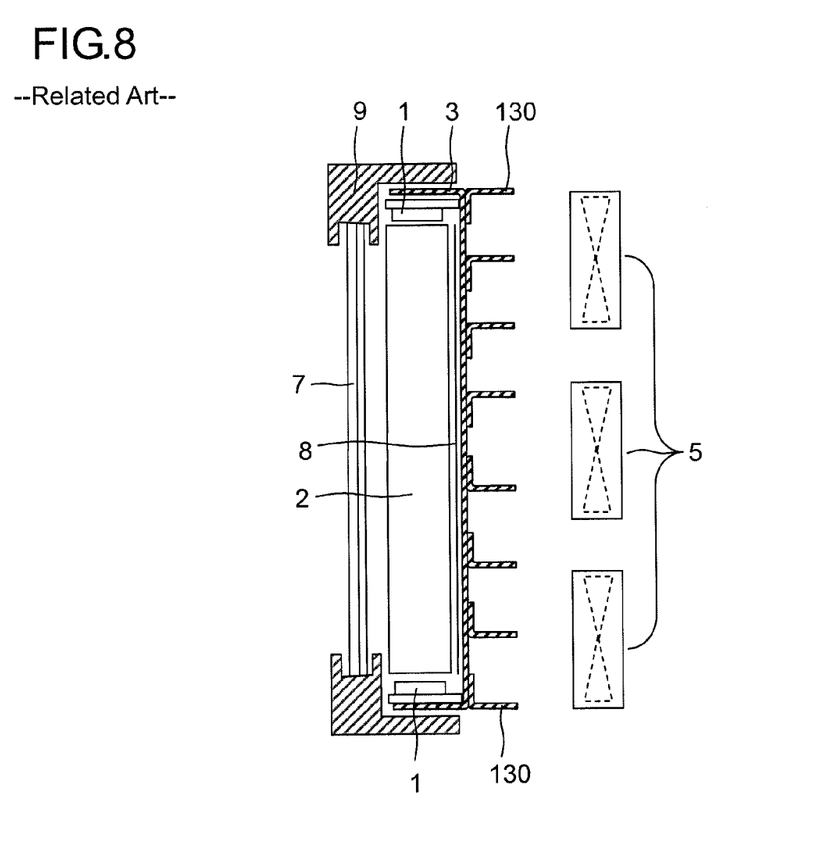
FIG. 8 is a sectional view of a conventional backlight structure.

A conventional backlight structure equipped with heat dissipation fins and cooling fans is shown in FIG. 8. This backlight structure is of a side-light type and includes: light source modules 1 and 1 arranged close to upper and lower edges of a liquid crystal display apparatus, respectively; a light guide plate 2 disposed between the light source modules 1 and 1; a rear plate 3 formed of metal and disposed at the rear side of the light source module 1 and the light guide plate 2; a plurality of heat dissipation fins 130 attached to a flat surface 3*b* of the rear plate 3; and a plurality of cooling fans 5 arranged at a predetermined interval at the rear side.

The above-described solutions, however, have disadvantages of increasing the size and costs of a backlight structure. More specifically, when cooling fans are provided in the conventional backlight structures, they need to be disposed, as shown in FIG. 8, at a predetermined distance from each other at the rear side of the heat dissipation fins; accordingly, the backlight structures have increased thicknesses and sizes. Moreover, enlarging the heat dissipation fins necessitates a plurality of cooling fans so as to blow air uniformly to the enlarged fins. Here, if the number of cooling fans is insufficient, uneven cooling of the heat dissipation fins tends to occur; consequently, the heat of the LED modules may be dissipated unevenly, causing a plurality of LED chips to emit different amounts of light, leading to uneven illuminance and colors in the images shown on a liquid crystal panel. In a case where large-size heat dissipation fins are used, therefore, a large number of cooling fans are required. Such use of a large number of cooling fans tends to cause interference of winds, leading to lower cooling efficiency; thus, the cooling fans need to be powerful, leading to a great increase in costs. Moreover, the use of a large number of cooling fans results in increased complexity of the backlight structures and increased noise generated thereby.

Moreover, in the conventional backlight structures described above, heat from the LED chips is transferred to the heat dissipation fins via a plurality of components such as a fixing member, a heat conductive sheet, and a heat conductive member; thus, the conventional backlight structures have the problem of low efficiency of heat transfer from the LED chips to the heat dissipation fins, and hence the problem of difficulty increasing cooling performance.

In light of the foregoing, an object of the present invention is to provide a backlight structure capable of efficiently cooling a light source with a simple construction, no increase in size and costs.

Means for Solving the Problem

To solve the above-identified problems, a backlight structure of the present invention includes: a light source module having a plurality of light sources; a light guide plate receiving, through a side surface thereof, and emitting, through a front surface thereof, light from the light sources; a rear plate disposed at a rear side of the light source module and the light guide plate and having, at the rear side of the light source module, a protruding portion protruding rearward; a cooling fan disposed at the rear side of part, other than the protruding portion, of the rear plate; a fan-mount plate having the cooling fan mounted thereon, the fan-mount plate being so disposed as to form a gap between the rear plate and the fan-mount plate; and a first wind passage formed in the gap between the rear plate and the fan-mount plate and permitting wind from the cooling fan to pass along a surface of the protruding portion of the rear plate and then to be exhausted.

With this construction, light from the light source module enters the light guide plate through a side surface thereof and leaves it from a front surface thereof, and then enters, for example, a liquid crystal display panel disposed at the front side of the light guide plate. Meanwhile, heat generated at the light sources of the light source module is transferred to the protruding portion of the rear plate disposed at the rear side of the light source module and is then rejected into the outside by the wind passing along the surface of the protruding portion. In this way, heat from the light source module is made to concentrate at the protruding portion of the rear plate and is then rejected by the wind guided to the protruding portion through the first wind passage formed between the rear plate and the fan-mount plate; thus, wind guiding and heat rejection are achieved by use of the same member, leading to an effective increase in cooling efficiency.

Moreover, as compared with conventional ways of transferring heat from the light sources to a heat dissipation fin via a plurality of members to reject it, this helps achieve efficient cooling of the light sources and also leads to a reduced number of parts. In addition, a cooling fan is disposed at the rear side of part of the rear plate other than the protruding portion, and a first wind passage is formed in a gap between the fan-mount plate having the cooling fan mounted thereon and the rear plate; this makes it possible to obtain a compact backlight structure having a small thickness despite its achieving forced cooling using a cooling fan. Thus, even when a high-illuminance LED is used as a light source, it is possible to obtain a compact and low-cost backlight structure of a side-light type that can achieve efficient cooling of a light source with a simple construction and that can hence be incorporated in large-size electronic apparatuses.

Moreover, in the backlight structure according to one embodiment, inside the protruding portion of the rear plate, part of the light source module is accommodated.

According to the above-described embodiment, heat generated at the light sources of the light source module is efficiently transferred to the protruding portion of the rear plate; owing to this, the light sources can be cooled efficiently. Moreover, even if the backlight structure has a large dimension in the thickness direction, part of the light source module accommodated inside the protruding portion prevents that backlight structure from having an increased dimension in the thickness direction; this helps achieve downsizing of a backlight structure.

Moreover, in the backlight structure according to one embodiment, the protruding portion of the rear plate is located close to an outlet of the first wind passage.

According to the above-described embodiment, wind guided through the first wind passage is made, for example, to strike the protruding portion and is then exhausted through the outlet; this effectively improves the efficiency with which heat is rejected from the protruding portion and how efficiently the light sources are cooled.

Moreover, the backlight structure according to one embodiment further includes a plurality of partition plates disposed between the rear plate and the fan-mount plate and defining the first wind passage.

According to the above-described embodiment, with the partition plates disposed between the rear plate and the fan-mount plate, it is possible to easily determine the shape and route of the first wind passage.

Moreover, in the backlight structure according to one embodiment, at least one of a drive circuit for the light source module and a drive circuit for a display panel is mounted on the fan-mount plate.

According to the above-described embodiment, with at least one of the drive circuit for the light source module and the drive circuit for the display panel mounted on the fan-mount plate, it is possible to reduce the size of the backlight structure.

Moreover, the backlight structure according to one embodiment further includes a second wind passage disposed in a gap between the rear plate and the fan-mount plate and permitting the wind from the cooling fan to pass along a surface of part, other than the protruding portion, of the rear plate and then to be exhausted.

According to the above-described embodiment, with the second wind passage, it is possible to guide wind with a constant temperature, separately from the wind guided through the first wind passage to cool the light sources.

Moreover, the backlight structure according to one embodiment further includes a partition plate disposed between the rear plate and the fan-mount plate and separating the first and second wind passages.

According to the above-described embodiment, it is possible to form the first and second wind passages with a simple construction.

Moreover, in the backlight structure according to one embodiment, at a position on the fan-mount plate where the second wind passage is located, at least one of a drive circuit for the light source and a drive circuit for a display panel is mounted.

According to the above-described embodiment, at least one of the drive circuit for the light source module and the drive circuit for the display panel can be cooled by the wind passing through the second wind passage, without being influenced by operation or heat generation of the light sources.

Moreover, in the backlight structure according to one embodiment, the light sources of the light source module are LEDs.

According to the above-described embodiment, it is possible to efficiently reject heat generated as the LEDs emit light, through the protruding portion of the rear plate. Thus, it is possible to obtain, using a high-illuminance LED generating a large amount of heat, a backlight structure for large-size electronic apparatuses, with no increase in size and costs thereof.

Moreover, in the backlight structure according to one embodiment, the cooling fan is an axial fan or a sirocco fan.

According to the above-described embodiment, an appropriate type of cooling fan is selected depending on where to dispose it; for example, an axial fan is used when it is mounted at the rear side of the fan-mount plate, a sirocco fan is used when it is mounted between the rear plate and the fan-mount plate, or the like; this makes it possible to reduce the size and costs of the backlight structure.

LIST OF REFERENCE SYMBOLS 1 light source module
1a mounting board of the light source module 1b LED chip of the light source module
2 light guide plate
3 rear plate
3a protruding portion of the rear plate
3b flat surface of the rear plate
3c end of the protruding portion of the rear plate
4 fan-mount plate
4a front surface of the fan-mount plate
4b end of the fan-mount plate
5 cooling fan
7 cooling wind passage (first wind passage)
12 partition plate
121-123 partition plate
13, 131 flow control plate
15 wind bypass (second wind passage)
16 second cooling wind passage (second wind passage)
31 protruding member

BEST MODE FOR CARRYING OUT THE INVENTION

Figure 1A:
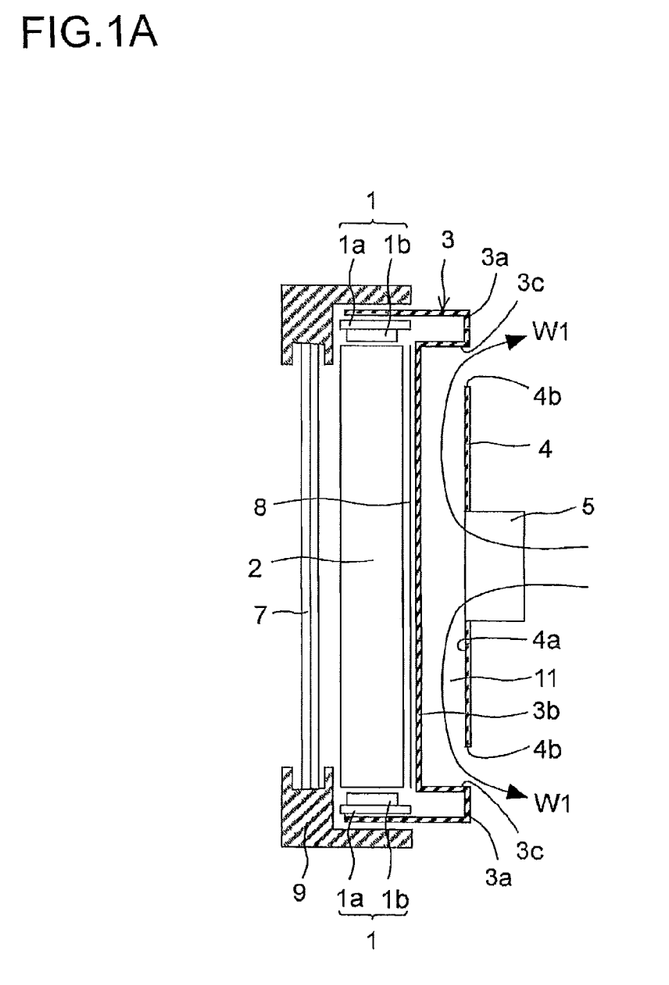
FIG. 1A is a sectional view of a liquid crystal display apparatus having a backlight structure of a first embodiment of the present invention.
Figure 1B:
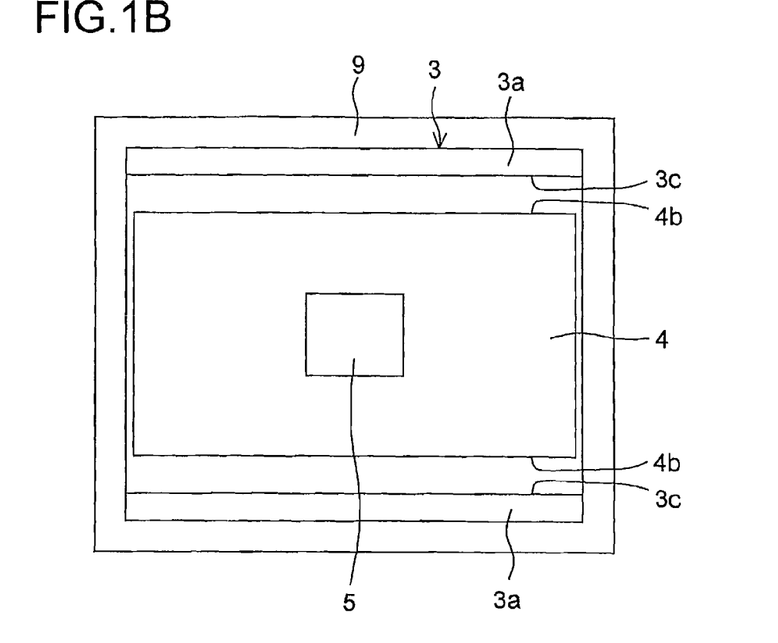
FIG. 1B is a rear view of a liquid crystal display apparatus having the backlight structure of the first embodiment.
Figure 1C:
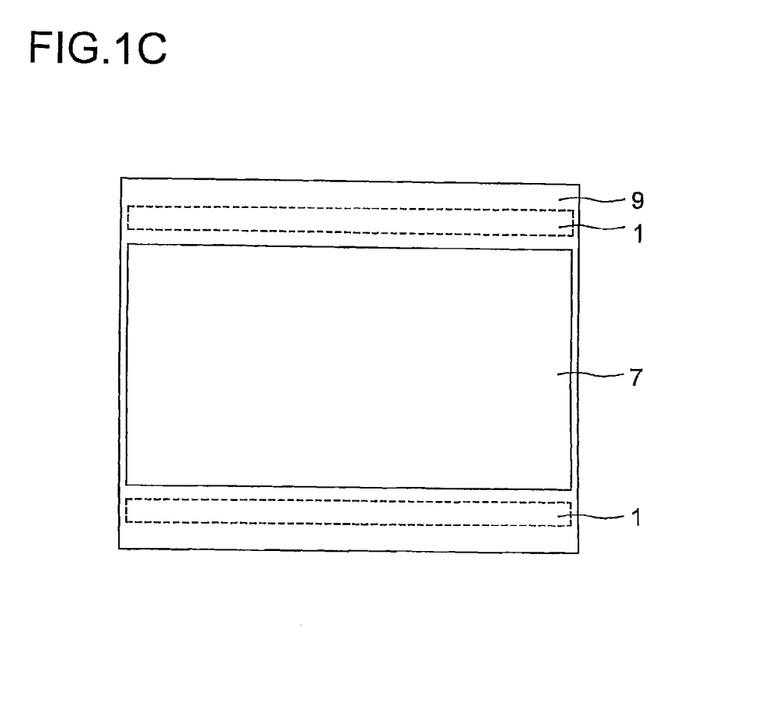
FIG. 1C is a front view of a liquid crystal display apparatus having the backlight structure of the first embodiment.

FIG. 1A is a sectional view schematically showing a liquid crystal display device having a backlight structure of a first embodiment of the present invention, FIG. 1B is a rear view of the liquid crystal display apparatus shown in FIG. 1A, and FIG. 1C is a front view of the liquid crystal display apparatus shown in FIG. 1A.

This backlight structure is of a side-light type and includes: light source modules 1 and 1 disposed near the upper and lower ends, respectively, of the liquid crystal display apparatus; a light guide plate 2 disposed between the light source modules 1 and 1; a rear plate 3 formed of metal and disposed at the rear side of the light source module 1 and the light guide plate 2; a fan-mount plate 4 disposed at the rear side of the rear plate 3 at a predetermined distance from the rear plate 3; and a cooling fan 5 mounted on the fan-mounted plate 4.

The light source module 1 includes an oblong mounting board 1a extending in the width direction of the liquid crystal display apparatus, and a plurality of LED chips 1b, serving as light sources, arranged in a straight line on the surface of the mounting board 1a facing a side surface of the light guide plate 2.

The light guide plate 2 is so formed that light from the LED chips 1b of the light source module 1 enters the light guide plate 2 through the upper and lower side surfaces thereof and leaves it through the front surface thereof. At the front side of the light guide plate 2, a liquid crystal display panel 7 is disposed. Moreover, at the rear side of the light guide plate 2, a reflective sheet 8 is disposed.

The rear plate 3 is so formed as to at least surround the light source modules 1 and 1 from the upper and lower ends thereof and to cover the rear surfaces of the light modules 1 and 1 and of the light guide plate 2. This rear plate 3 has upper and lower end portions thereof, located at the rear side of the light source modules 1 and 1, formed into protruding portions 3a protruding rearward. Moreover, the rear plate 3 has a portion thereof between the upper and lower protruding portions 3a formed into a flat surface 3b close to the rear surface of the light guide plate 2. The protruding portions 3a of the rear plate 3 are so formed as to extend along the upper and lower ends of the rear plate 3, in positions corresponding to where the light source modules 1 and 1 are arranged.

The fan-mount plate 4 is so formed as to have a dimension substantially same as the rear plate 3 in the width direction and have a dimension smaller than the flat surface 3b of the rear plate in the height direction. This fan-mount plate 4 is located, in the front/rear direction, at substantially the same position as the rear end of the protruding portions 3a of the rear plate, and a cooling wind passage 11 is formed as a first wind passage between a front surface 4a of the fan-mount plate and the flat surface 3b of the rear plate. Outlets of the cooling wind passage 11 are formed between the upper and lower ends 4b and 4b of the fan-mount plate and the ends 3c and 3c of the upper and lower protruding portions 3a and 3a of the rear plate facing the upper and lower ends 4b and 4b of the fan-mount plate.

The cooling fan 5 is composed of an axial fan and is so formed as to suck in air through a suction port provided at a rear surface thereof and to blow out the air into the cooling wind passage 11 through a discharge port provided at a front surface thereof.

The backlight structure thus formed by fitting its constituent components to the rear plate 3 is then coupled to a plastic frame 9 supporting the liquid crystal display panel 7 so as to form the liquid crystal display apparatus.

The liquid crystal display apparatus having the above-described backlight structure operates as follows. When a power switch of the liquid crystal display apparatus is turned on, an unillustrated power supply circuit starts up to feed power to the light source modules 1 and 1, and thus, the plurality of LED chips 1b, 1b, . . . in the light source modules emit light. The light emitted from the LED chips 1b, 1b, . . . enters the light guide plate 2 through the upper and lower side surfaces thereof, passes inside the light guide plate 2, and then leaves it through the front surface thereof. The light having thus left the front surface of the light guide plate 2 then enters the liquid crystal panel 7, where the transmittance with which the light is transmitted is controlled in accordance with control and image signals inputted to the liquid crystal panel 7, so that a predetermined image is shown on the screen.

As the liquid crystal display apparatus starts up, the cooling fan 5 starts to operate to generate flows of air, as indicated by arrows W1 and W1, through the cooling wind passage 11. Here, the heat generated as the LED chips 1b, 1b, . . . emit light conducts through the mounting board 1a and concentrates at the protruding portions 3a of the rear plate; the heat is then carried by the wind passing through the cooling wind passage 11 and is then rejected through the outlets. The protruding portions 3a of the rear plate are located at the rear side of the light source modules 1; thus, they can efficiently collect the heat from the LED chips 1b. Moreover, having a protruding shape, the protruding portions 3a have a large surface area and in addition are struck by the wind guided through the cooling wind passages 11; thus, the protruding portions 3a can efficiently reject heat from the LED chips 1b and effectively cool the LED chips 1b. Further, the protruding portions 3a, which reject heat, are formed of the same material as the flat surface 3b forming the cooling wind passage 11; this helps achieve high cooling efficiency and leads to a reduced number of parts. In addition, heat is transferred from the LED chips to the protruding portions 3a through fewer parts than in conventional structures; this leads to increased heat transfer efficiency and hence increased cooling efficiency.

Moreover, the cooling fan 5 is mounted on the fan-mount plate 4 located at the rear side of the flat surface 3b of the rear plate, and the cooling wind passage 11 is formed between the flat surface 3b of the rear plate and the fan-mount plate 4; this makes it possible to obtain a backlight structure having a small thickness, despite its adopting forced cooling using a cooling fan 5.

Moreover, the protruding portions 3a are cooled by wind sent thereto through the cooling wind passage 11; this helps achieve less uneven cooling than by sending wind from a cooling fan to the conventional heat dissipation fins. Thus, there is no need to increase the number of cooling fans or to use a high-capacity fan to prevent uneven cooling; it is thus possible to augment the cooling efficiency without an increase in the number of parts or in costs.

As described above, due to its simple construction with a reduced number of parts, the backlight structure of this embodiment can be made compact and offers satisfactory cooling performance; it can thus adopt a high-illuminance LED generating a large amount of heat as a light source. This makes it possible to realize, using a high-illuminance LED as a light source, a backlight structure that can be incorporated in large-size electronic apparatuses.

Figure 2:
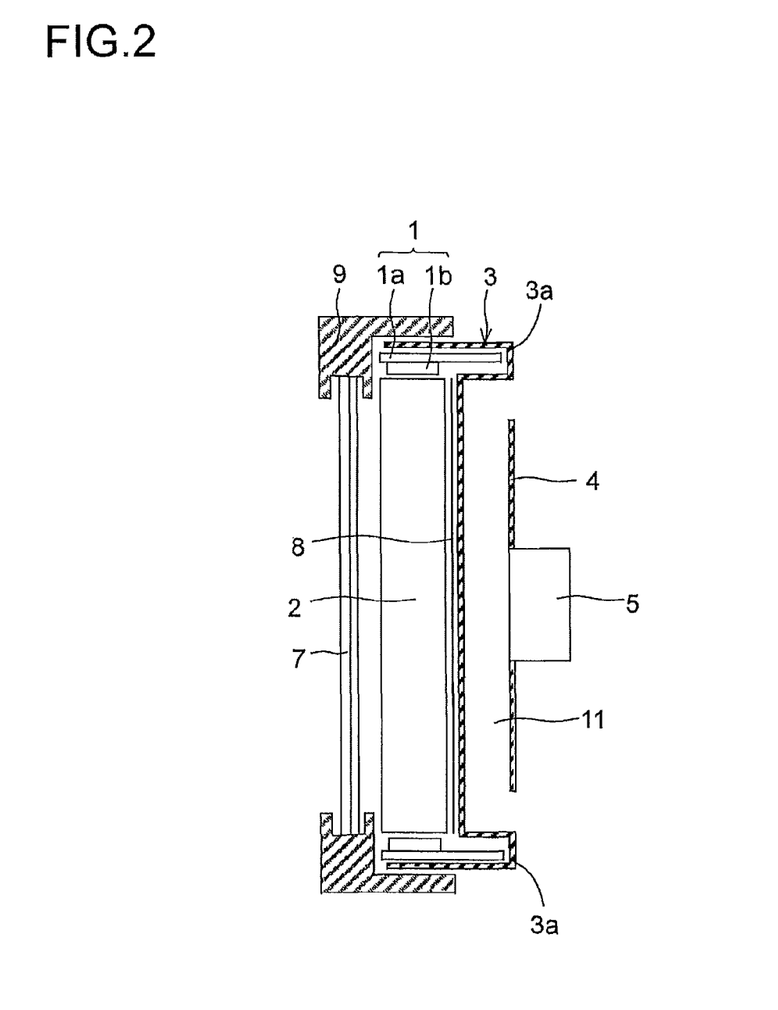
FIG. 2 is a sectional view of a backlight structure of a modified example of the first embodiment.

In the backlight structure of the first embodiment, the protruding portions 3a of the rear plate may not only perform heat rejection but also accommodate other constituent components. FIG. 2 is a sectional diagram showing a modified example of the backlight structure of the first embodiment. In the backlight structure of this modified example, the mounting board 1a of the light source module has a dimension larger than that of the first embodiment in the width direction (in the front/rear direction of the backlight structure), with a rear portion of the mounting board 1a disposed inside the protruding portion 3a. Even when a light source module 1 like this having a large dimension in the width direction is used, it is possible to obtain a compact backlight structure having a small thickness, with no increase in the dimension of the rear plate 3 in the front/rear direction. Moreover, part of the light source module 1 is accommodated inside the protruding portion 3a, which receives the wind from the cooling fan 5; this leads to further increased cooling efficiency of the light sources.

Figure 3:
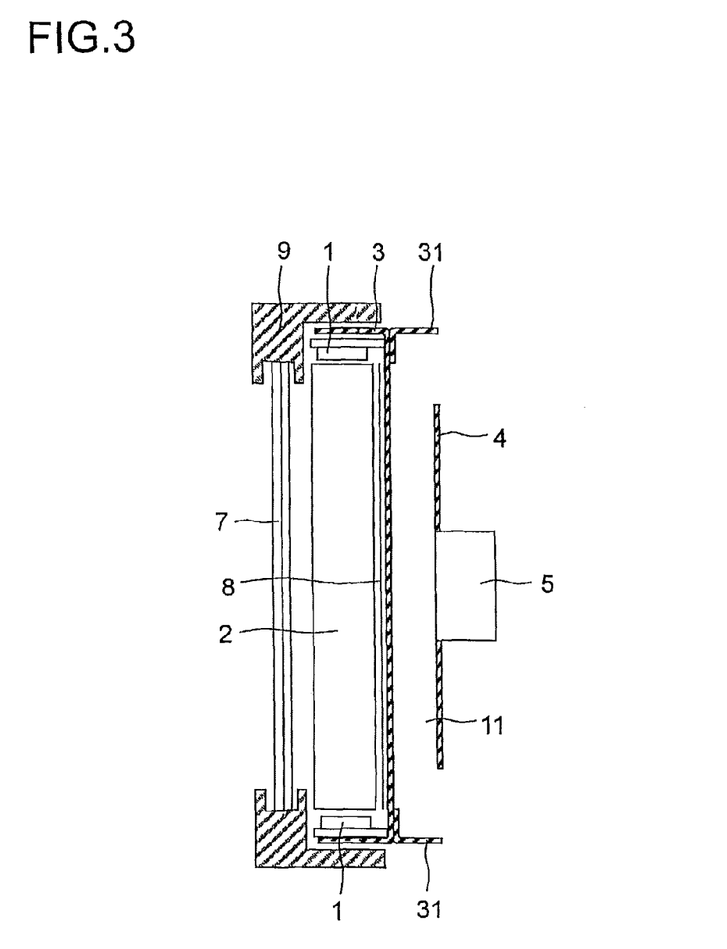
FIG. 3 is a sectional view of a backlight structure of a second embodiment of the present invention.

FIG. 3 is a sectional view of a backlight structure of a second embodiment of the present invention, and this backlight structure has the same construction as that of the first embodiment except that the rear plate 3 does not have a protruding portion but protruding members 31 having an L-shaped section. The same constituent components as in the first embodiment will be identified by the same reference numerals. In the backlight structure of the second embodiment, heat from the LED chips 1b is transferred to the protruding members 31, which are separate members attached to upper and lower end portions, respectively, of the rear plate 3, and is then rejected from the protruding members 31 by the wind blown thereon to from the cooling fan 5.

In the backlight structure of the second embodiment, since the protruding members 31 are separate from the rear plate 3, heat conduction efficiency is lower than in the first embodiment, and since the protruding members 31 are formed in a plate shape, the heat rejection area is smaller and heat rejection efficiency is lower than in the first embodiment. Accordingly, the light sources are cooled with lower efficiency than in the first embodiment. In comparison, the backlight structure of the first embodiment is preferable because there, since heat rejection is achieved by the protruding portions 3a formed integrally with part of the rear plate 3, heat is efficiently transferred from the light source modules 1 to the protruding portions 3a and is then efficiently rejected from over a large heat rejection area, and in addition the number of parts is reduced.

Figure 4:
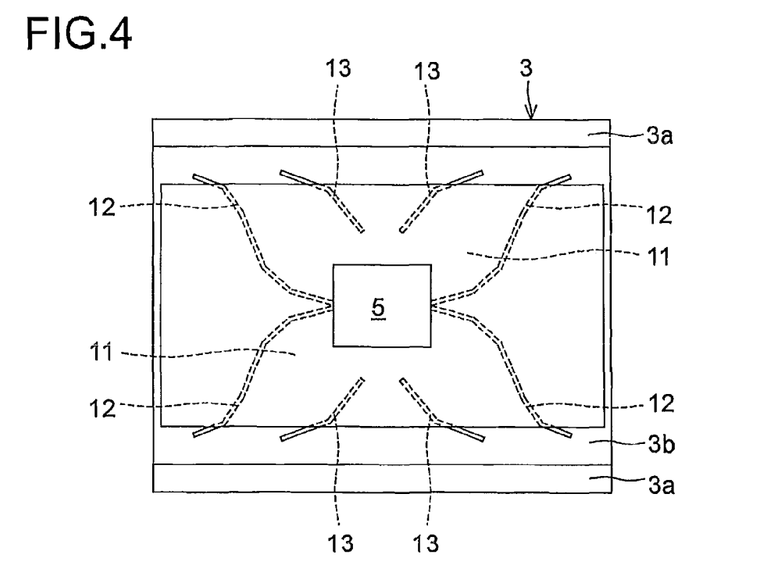
FIG. 4 is a rear view of a backlight structure of a third embodiment of the present invention.

FIG. 4 is a rear view of a backlight structure of a third embodiment. The backlight structure of the third embodiment has the same construction as that of the first embodiment except that partition plates 12 and flow control plates 13 are disposed between the rear plate 3 and the fan-mount plate 4. The same constituent components as in the first embodiment will be identified by the same reference numerals, and no detailed description thereof will be given.

In the backlight structure of the third embodiment, four partition plates 12 defining cooling wind passages 11 are fixed between the flat surface 3b of the rear plate and an interior surface of the fan-mount plate 4 facing the flat surface 3b. As shown in FIG. 4, two of the partition plates 12 extend, while being bent, from the opposite ends of the cooling fan 5 toward the opposite ends of each of the protruding portions 3a so as to define the cooling wind passage 11 between these two partition plates 12. Two cooling wind passages 11 are thus formed one above and one below the cooling fan 5. Inside each of the two cooling wind passages 11 and 11 defined by the partition plates 12, two flow control plates 13 are disposed. The flow control plates 13, like the partition plates 12, are fixed between the flat surface 3b of the rear plate and the interior surface of the fan-mount plate 4. Those two flow control plates 13 are arranged substantially symmetrically in the left and right sides of the cooling wind passages 11 and are so formed as to have an increasing distance between them from the cooling fan 5 toward the protruding portions 3a.

In the backlight structure constructed as described above, wind from the cooling fan 5 is guided to the protruding portions 3a through the cooling wind passages 11 and 11 separated by the partition plates 12 and 12, while the flows of the wind are controlled by the flow control plates 13 and 13 so as to reduce flow loss. Thus, wind from the cooling fan 5 can be efficiently guided to the protruding portions 3a to achieve heat rejection, permitting the light sources to be cooled with increased efficiency.

Figure 5:
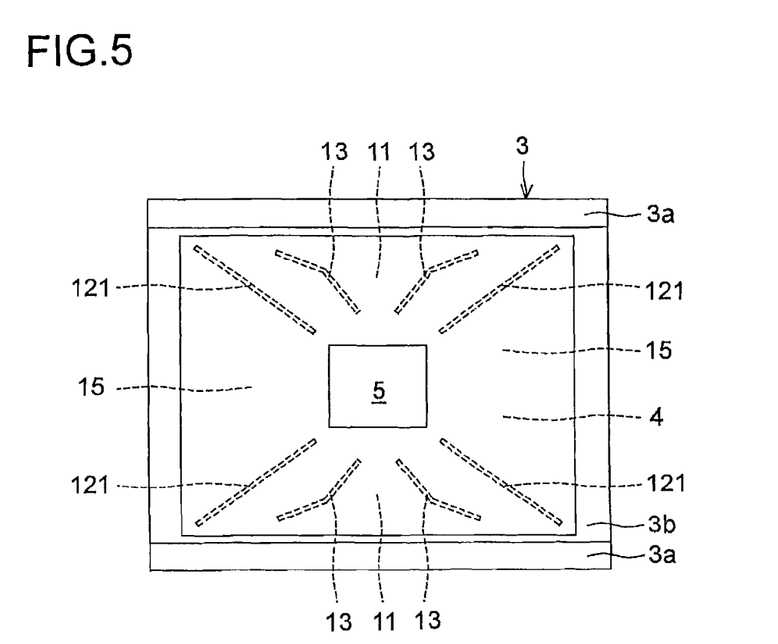
FIG. 5 is a rear view of a backlight structure of a fourth embodiment of the present invention.

FIG. 5 is a rear view of a backlight structure of a fourth embodiment. The backlight structure of the fourth embodiment has the same construction as that of the third embodiment except that partition plates 121 of a different shape are used. The same constituent components as in the third embodiment will be identified by the same reference numerals, and no detailed description thereof will be given.

In the backlight structure of the fourth embodiment, as shown in FIG. 5, four partition plates 121, 121, . . . defining cooling passages 11 are formed radially from positions apart from the cooling fan 5 toward four corners of the fan-mount plate 4. Thereby, located at the left and right sides of the cooling fan 5, wind bypasses 15 and 15 are formed inside the areas lying between the upper and lower partition plates 121 and 121. In this backlight structure, the wind from the cooling fan 5 is partly made to pass through the wind bypasses 11 and 11 so as to be guided to the protruding portions 3a and 3a located at upper and lower ends of the rear plate 3, and is partly made to pass through the wind bypasses 15 and 15 so as to be guided to the left and right sides of the rear plate 3. Thus, with the cooling fan 5, it is possible to cool not only the protruding portions 3a but also the flat surface 3b of the rear plate and the fan-mount plate 4.

Figure 6:
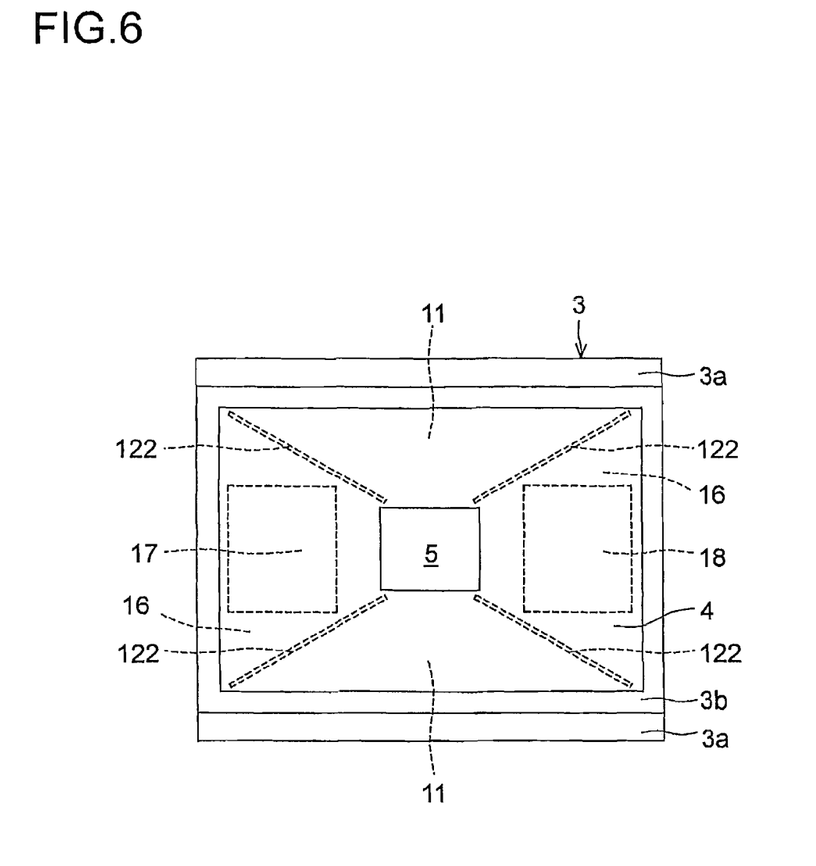
FIG. 6 is a rear view of a backlight structure of a fifth embodiment of the present invention.

FIG. 6 is a rear view of a backlight structure of a fifth embodiment. The backlight structure of the fifth embodiment has the same construction as that of the fourth embodiment except that partition plates 122 of a different shape are used and that a liquid crystal panel drive circuit 17 and an LED drive power supply circuit 18 are mounted between the flat surface 3b of the rear plate and the fan-mount plate 4. The same constituent components as in the fourth embodiment will be identified by the same reference numerals, and no detailed description thereof will be given.

In the backlight structure of the fifth embodiment, as shown in FIG. 6, four partition plates 122, 122, . . . are formed radially from positions close to the cooling fan 5 toward four corners of the fan-mount plate 4. By these partition plates 122, two first cooling wind passages 11 and 11 are so formed as to extend from the cooling fan 5 toward the protruding portions 3a and 3a located at the upper and lower ends of the rear plate, one on each side, and two second cooling wind passages 16 and 16, serving as second wind passages, are so formed as to extend from the cooling fan 5 to the left and right ends of the rear plate, one on each side. Midway along these two second cooling wind passages 16 and 16, the liquid crystal panel drive circuit 17 and the LED drive power supply circuit 18 are disposed, respectively. In this backlight structure, the wind from the cooling fan 5 can be partly guided into the first cooling wind passages 11 and 11 so as to cool the LEDs, and can be partly guided into the second cooling wind passages 16 and 16 so as to cool the liquid crystal panel drive circuit 17 and the LED drive power supply circuit 18. Although this embodiment deals with such a construction in which the liquid crystal panel drive circuit 17 and the LED drive power supply circuit 18 are disposed inside the cooling wind passages 16 and 16 so as to be cooled by the wind directly blown thereonto, it is also possible to dispose at least one of the liquid crystal panel drive circuit 17 and the LED drive power supply circuit 18 at a position on the rear surface of the fan-mount plate 4 and at the rear side of the second cooling passages 16 so that cooling is achieved via the fan-mount plate 4.

Figure 7A:
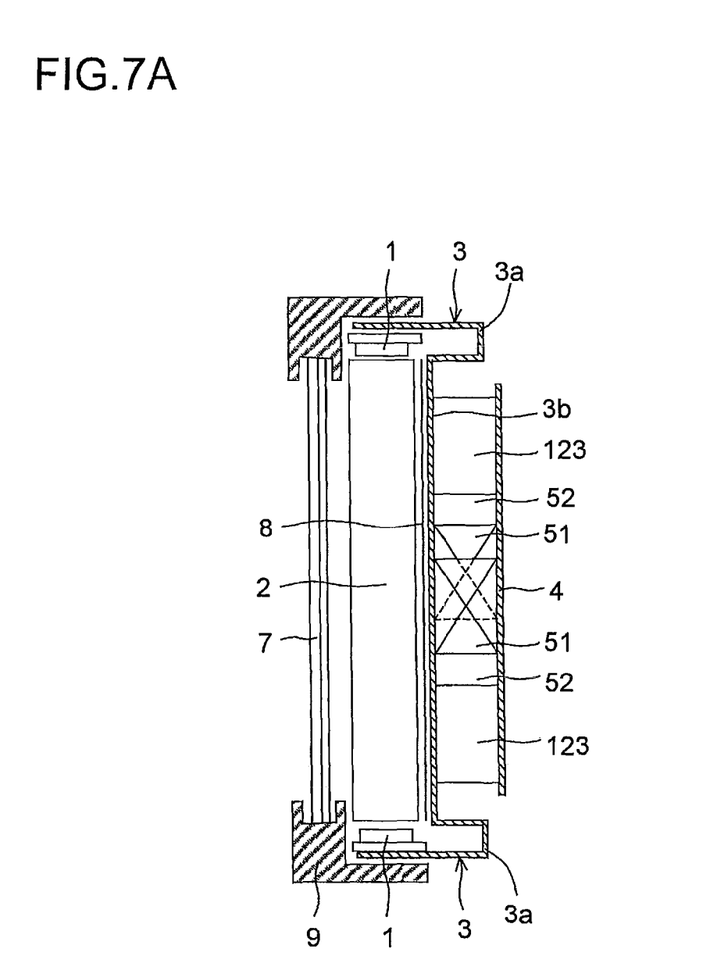
FIG. 7A is a sectional view of a backlight structure of a sixth embodiment of the present invention.
Figure 7B:
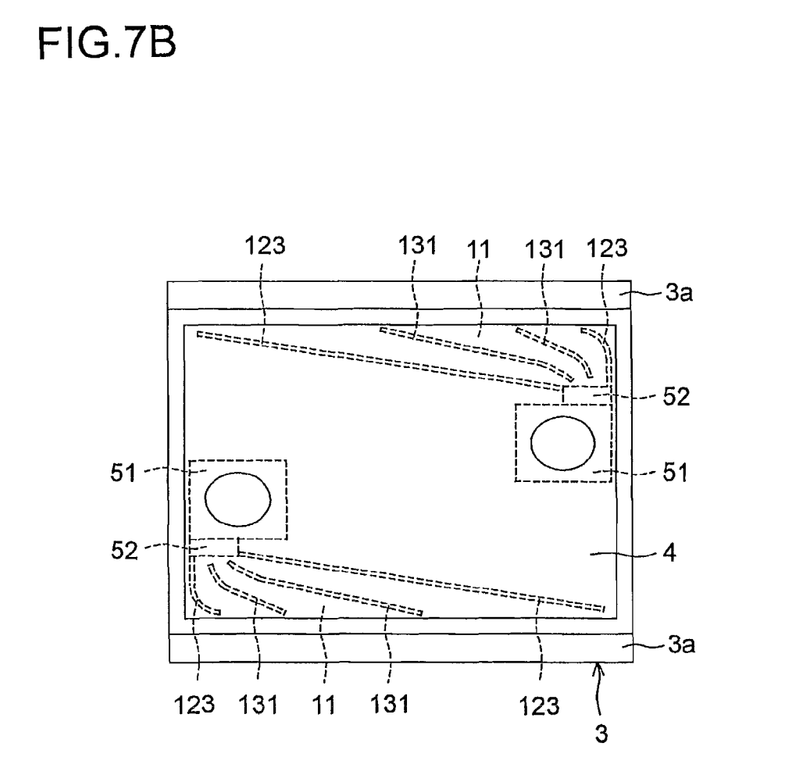
FIG. 7B is a rear view of the backlight structure of the sixth embodiment.

FIG. 7A is a sectional view of a backlight structure of a sixth embodiment, and FIG. 7B is a rear view of the backlight structure of the sixth embodiment. In this embodiment, the same constituent components as in the first embodiment will be identified by the same reference numerals, and no detailed description thereof will be given.

In the backlight structure of the sixth embodiment, two cooling fans 51 and 51 each formed with a sirocco fan are mounted on the surface of the fan-mount plate 4 facing the rear plate 3, and winds from the two cooling fans 51 and 51 are separately guided to the protruding portions 3a and 3a of the rear plate through two cooling wind passages 11 and 11.

As shown in FIG. 7B, the two cooling fans 51 and 51 are mounted in the vicinity of the left and right ends of the fan-mount plate 4 and substantially in the center thereof in the upper/lower direction. For each of the cooling fans 51, two partition plates 123 and 123 are arranged from the left and right ends of a discharge port 52 of the cooling fan 51 toward the left and right ends of the protruding portion 3a of the rear plate. These partition plates 123 and 123 form the cooling wind passage 11 therebetween, and inside each of the cooling wind passages 11 and 11, two flow control plates 131 and 131 are arranged, respectively.

In the backlight structure of this embodiment, owing to the cooling fans 51 and 51 being accommodated in a gap between the rear plate 3 and the fan-mount plate 4, the rear surface of the rear plate 3 can be made flat to look good, and the overall thickness can be reduced. The use of a sirocco fan for the cooling fan 51 makes it possible to downsize the cooling fan 51 with the amount of wind generated therefrom maintained. Thus, it is possible to achieve further slimming-down of a backlight structure without detriment to cooling performance at the light sources.

Although the above-described embodiments deal with the case where the backlight structure of the present invention is used in a liquid crystal display panel to form a liquid crystal display apparatus, it is also possible to use the backlight structure of the present invention for illumination in any other type of image display apparatus. In addition, the light source used in the light source module is not limited to an LED, and any other type of light emitting element may also be used therein.

INDUSTRIAL APPLICABILITY

The present invention is applicable to a backlight structure included in liquid crystal display apparatuses such as a liquid crystal television receiver and a liquid crystal monitor, and the present invention, according to which heat generated in the light sources of the light source modules is transferred to protruding portions of the rear plate and is then rejected into the outside by wind guided through first wind passages formed in a gap between a fan-mount plate and a rear plate, can offer a compact backlight structure with a simple construction, despite its adopting forced cooling using a cooling fan.

The invention claimed is:

1. A backlight structure comprising:
    a light source module having a plurality of light sources;
    a light guide plate receiving, through a side surface thereof, and emitting, through a front surface thereof, light from the light sources;
    a rear plate disposed at a rear side of the light source module and the light guide plate and having, at the rear side of the light source module, a protruding portion protruding rearward;
    a cooling fan disposed at the rear side of part, other than the protruding portion, of the rear plate;
    a fan-mount plate having the cooling fan mounted thereon, the fan-mount plate being so disposed as to form a gap between the rear plate and the fan-mount plate; and
    a first wind passage formed in the gap between the rear plate and the fan-mount plate and permitting wind from the cooling fan to pass along a surface of the protruding portion of the rear plate and then to be exhausted.

2. The backlight structure according to claim 1, wherein inside the protruding portion of the rear plate, part of the light source module is accommodated.

3. The backlight structure according to claim 2, wherein the light sources of the light source module are LEDs.

4. The backlight structure according to claim 2, wherein the cooling fan is an axial fan or a sirocco fan.

5. The backlight structure according to claim 1, wherein the protruding portion of the rear plate is located close to an outlet of the first wind passage.

6. The backlight structure according to claim 5, wherein the light sources of the light source module are LEDs.

7. The backlight structure according to claim 5, wherein the cooling fan is an axial fan or a sirocco fan.

8. The backlight structure according to claim 1, further comprising
    a plurality of partition plates disposed between the rear plate and the fan-mount plate and defining the first wind passage.

9. The backlight structure according to claim 8, wherein the light sources of the light source module are LEDs.

10. The backlight structure according to claim 8, wherein the cooling fan is an axial fan or a sirocco fan.

11. The backlight structure according to claim 1, wherein at least one of a drive circuit for the light source module and a drive circuit for a display panel is mounted on the fan-mount plate.

12. The backlight structure according to claim 11, wherein the light sources of the light source module are LEDs.

13. The backlight structure according to claim 11, wherein the cooling fan is an axial fan or a sirocco fan.

14. The backlight structure according to claim 1, further comprising
    a second wind passage disposed in the gap between the rear plate and the fan-mount plate and permitting the wind from the cooling fan to pass along a surface of part, other than the protruding portion, of the rear plate and then to be exhausted.

15. The backlight structure according to claim 14, further comprising
a partition plate disposed between the rear plate and the fan-mount plate and separating the first and second wind passages.

16. The backlight structure according to claim 15, wherein the light sources of the light source module are LEDs.

17. The backlight structure according to claim 15, wherein the cooling fan is an axial fan or a sirocco fan.

18. The backlight structure according to claim 14, wherein at a position on the fan-mount plate where the second wind passage is located, at least one of a drive circuit for the light source module and a drive circuit for a display panel is mounted.

19. The backlight structure according to claim 18, wherein the light sources of the light source module are LEDs.

20. The backlight structure according to claim 18, wherein the cooling fan is an axial fan or a sirocco fan.

21. The backlight structure according to claim 14, wherein the light sources of the light source module are LEDs.

22. The backlight structure according to claim 14, wherein the cooling fan is an axial fan or a sirocco fan.

23. The backlight structure according to claim 1, wherein the light sources of the light source module are LEDs.

24. The backlight structure according to claim 1, wherein the cooling fan is an axial fan or a sirocco fan.

* * * * *